Patented Sept. 10, 1935

2,013,659

UNITED STATES PATENT OFFICE 2,013,659

COMPOUND OF THE AZABENZANTHRONE SERIES

Max Albert Kunz, Mannheim, and Gerd Kochendoerfer and Karl Koeberle, Ludwigshafen-on-the-Rhine, Germany, assignors to General Aniline Works, Inc., New York, N. Y., a corporation of Delaware No Drawing. Application March 30, 1933, Serial No. 663,647. In Germany October 26, 1932

6 Claims. (Cl. 260—40)

The present invention relates to new nitrogenous compounds and a process of producing same.

In a copending application Ser. No. 663645, filed on March 30th, A. D. 1933 by Kunz and Kochendoerfer, there is described that valuable nitrogenous condensation products are obtained by causing compounds which are capable of reacting as acrolein, for example acrolein or its homologues or substitution products to act in an acid medium on pyridinonaphthalenes which contain in the isocyclic rings at least one substituent selected from the group =O and —OH. Products obtainable in this manner are referred to in the following as "azabenzanthrones".

This term is employed with reference to the nomenclature suggested by the Commission ordered by the International Union for Chemistry (cf. Journal of the American Chemical Society, vol. 55, pages 3905 to 3925, 1933). It means benzanthrones one —CH group of which is replaced by an N-atom. According to the said copending application Ser. No. 663,645, 5-, 8- and Bz3-azabenzanthrones are obtainable.

The azabenzanthrone constitution may be represented by the formula

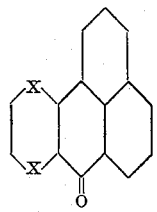

wherein one X represents a nitrogen atom, the other X representing —CH—.

We have now found that valuable products are obtained from the said 5- or 8-azabenzanthrones by the introduction of negative substituents.

By treating 5- or 8-azabenzanthrones with halogen or agents yielding halogen, halogen derivatives may be obtained; for example by bromination in inorganic or organic media bromoderivatives, by iodation in sulphuric acid iodo derivatives may be prepared; 5- or 8-azabenzanthrones containing different halogens may be obtained in a corresponding manner. By nitrating the 5- or 8-azabenzanthrones with nitric acid, if desired in the presence of sulphuric acid, nitrobenzene or glacial acetic acid etc., nitro derivatives are obtained which may be reduced to the corresponding amino compounds. By treating the 5- or 8-azabenzanthrones with concentrated or fuming sulphuric acid, chlorosulphonic acid or chlorosulphonic acid salts sulphonic acids may be obtained. By the action of oxidizing agents such as pyrolusite and sulphuric acid, hydroxy derivatives are formed, and by the action of chloride of sulphur mercapto compounds, and by the action of hydroxylamine in the presence of sulphuric acid amino compounds.

The substituents may replace hydrogen atoms or other substituents already present in the molecule. In the latter case a change of the substituents already present may occur.

5- or 8-azabenzanthrones substituted by amino or sulphonic acid groups may be converted according to the well known methods into hydroxy 5- or 8-azabenzanthrones which may be alkylated or arylated if desired. Amino 5- or 8-azabenzanthrones may be converted into halogen, cyano, sulphocyano or mercapto compounds by way of the diazo compounds according to the method of Sandmeyer.

Halogen pyrbenzanthrones obtainable by direct halogenation of pyrbenzanthrones or by replacing the nitro groups of nitro-pyrbenzanthrones by halogen as well as products obtained by starting with halogen containing initial materials and forming the pyrbenzanthrones as described in the aforementioned application may be caused to react with active hydrogen or metal atoms attached to a reactive nitrogen, oxygen or sulphur atoms, for example with ammonia, amines such as aniline, or amino ketones such as amino anthraquinones, phenolates such as sodium phenolate, sodium sulphide, thioglycolic acid etc. By treatment with elementary sulphur or selenium or with oxygen compounds of selenium derivatives containing sulphur or selenium may be prepared from halogen 5- or 8-azabenzanthrones. By the action of cuprous cyanide in the heat nitriles are formed which may be saponified according to the usual methods to yield the corresponding carboxylic acids. According to the method of Friedel-Crafts from pyrbenzanthrones and acid chlorides compounds of the character of ketones are produced. Several substituents may be introduced into the molecules of 5- or 8-azabenzanthrones simultaneously or successively.

Generally the substitution products are obtained in very good yields and a very pure state. If necessary they may be purified according to usual methods, as for example by crystallization, sublimation, extraction with boiling solvents, by treatment with oxidizing agents or by way with their salts. Isomeric compounds may be separated off by these treatments.

The following examples will further illustrate the nature of this invention but the invention is not restricted to these examples. The parts are by weight.

Example 1

46 parts of 8-azabenzanthrone corresponding to the formula:—

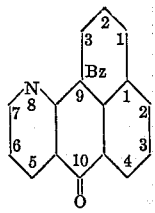

(obtainable according to the first paragraph of Example 1 of the aforementioned application) are suspended in 240 parts of nitrobenzene with the addition of 1 part of iron and 2 parts of iodine. Then 75 parts of bromine are allowed to flow slowly into the mixture at from 70° to 75° C. The said temperature is maintained until a decrease in free bromine is no longer observed. Then the reaction mixture is allowed to cool and the yellow mass which has separated in crystalline form is filtered off by suction, the residue is warmed with dilute caustic sodium hydroxide at about 50° C., filtered off by suction and the residue now remaining is recrystallized from glacial acetic acid. A monobromazabenzanthrone melting at from 214° to 215° C., dissolving in concentrated sulphuric acid giving a yellow coloration and a greenish yellow fluorescence is thus obtained. The bromination may be effected while adding calcium carbonate or substances having a similar action are added from the beginning in order to neutralize the hydrobromic acid which is produced in the reaction.

In an analogous manner bromo derivatives may be obtained from the azabenanthrone prepared according to Example 3 of the said application and the methyl substitution product of 8-azabenzanthrone obtained according to Example 2.

Example 2

500 parts of 8-azabenzanthrone, 25 parts of iodine and 5 parts of iron are heated in 2500 parts of nitrobenzene while stirring at 170° C. 1500 parts of bromine are allowed to flow slowly into the reaction mixture which is maintained at a temperature of between 170° and 180° C. until the bromination is complete. The reaction product precipitated in crystalline form is worked up in the usual manner; it is a diabrom-8-azabenzanthrone crystallizing in felt-like yellow little needles melting at above 300° C. besides this compound small amounts or higher brominated products are obtained melting at above 360° C. The bromazabenzanthrones thus obtained dissolve in concentrated sulphuric acid giving a yellow coloration.

In an analogous manner chloroderivatives may be obtained by chlorinating 8-azabenzanthrone, for example in tri-chlorobenzene in the presence of iodine at from 170° to 180° C., for example a di- and a tri-chloroderivative. By treating the said initial material with iodine in concentrated sulphuric acid iodo-derivatives may be produced.

By brominating 8-azabenzanthrone and subsequently chlorinating the products or vice versa chlorobromo derivatives may be obtained.

The bromination may be effected in the absence of diluents or in aqueous suspension.

Example 3

23 parts of 8-azabenzanthrone are suspended in 180 parts of nitrobenzene and 22 parts of 98 per cent nitric acid are allowed to flow by and by into the mixture at 90° C. while stirring. As soon as the nitration is completed the reaction mixture is allowed to cool; the reaction product is filtered off by suction, washed with some nitrobenzene, steamed in order to eliminate the adhering nitrobenzene and recrystallized from an organic solvent such as dichlorobenzene. A mononitroazabenzanthrone is obtained in the form of orange yellow needles melting at from 285° to 286° C.

If the mononitro-8-azabenzanthrone thus obtained which contains the nitro group probably in the 2-position of the Bz-nucleus, is treated with reducing agents such as an aqueous solution of sodium sulphide, a scarlet red amino-8-azabenzanthrone melting at from 267° to 268° C. is obtained. By treating this product with acetic acid anhydride an acetyl derivative therefrom is obtained which may be converted into a brominated product by treatment with bromine. The amino-8-azabenzanthrone may be diazotized thus yielding a diazonium compound from which a hydroxy-8-azabenzanthrone is obtained by heating with water at 80° to 90° C. This hydroxyazabenzanthrone may be converted into the corresponding methoxyazabenzanthrone by treatment with toluene sulphonic acid methyl ester and potassium carbonate in nitrobenzene solution at 200° C. the said methoxy derivative crystallizes from glacial acetic acid in yellowish leaflets.

If instead of 8-azabenzanthrone isomeric azabenzanthrones are used, for example 5-azabenzanthrone or the product obtainable according to Example 3 of the said application, the corresponding nitro, amino and hydroxy compounds may be obtained in an analogous manner.

Example 4

23 parts of 8-azabenzanthrone are added slowly to 350 parts of 23 per cent fuming sulphuric acid; a temperature of between 90° and 100° C. is maintained until the sulphonation is completed. The mixture is poured onto ice, the residue is purified by dissolving in ammonia and precipitating with dilute sulphuric acid whereby a purification is obtained. 8-azabenzanthrone sulphonic acid thus obtained is readily soluble in hot water, insoluble in methyl alcohol and melts at above 300° C.

The sulphonic acid group may be replaced by other substituents for example by the hydroxy group or halogen; by reduction the sulphonic acid group may be converted into the mercapto group.

Example 5

30 parts of 8-azabenzanthrone and 300 parts of benzoyl chloride are heated to boiling for some hours in a vessel provided with a reflux condenser; the mass is then filtered while hot. While cooling a brown mass separates from the filtrate. This mass is not vattable; it dissolves in boiling trichlorbenzene only to low degree giving a yellowish green fluorescence; in pure form it is a brick-red powder.

Example 6

15 parts of the brom-8-azabenzanthrone obtainable according to Example 5 of the said application are heated with 7 parts of cuprous cyanide in 300 parts of pyridine in an autoclave. A temperature of between 150° and 155° C. is maintained until unchanged initial material can no longer be detected. The reaction product is filtered off by suction and recrystallized from dichlorobenzene. Monocyanoazabenzanthrone thus obtained melts at 305° to 307° C. and yields a azabenzanthrone carboxylic acid when treated with hydrochloric acid or sulphuric acid.

*Example 7*

150 parts of Bz.1-brom-8-azabenzanthrone (obtainable according to Example 1 of the present application), 250 parts of sodium sulphide and 100 parts of sulphur are heated in 1000 parts of butyl alcohol to boiling until the whole mass is dissolved. Then the mass is allowed to cool, diluted with water and acidified with acetic acid. The reaction product is filtered off, it is a yellow powder dissolving in alkali giving a red violet coloration and in concentrated sulphuric acid giving a violet coloration. According to its properties, it is Bz.1-mercapto-8-azabenzanthrone.

By oxidation by means of hydrogen peroxide a yellow reaction product insoluble in alkali is obtained which is probably the corresponding disulphide.

From Bz.1-brom-8-azabenzanthrone, and selenium in an analogous manner a reaction product containing selenium may be prepared. From Bz.1-halogen-8-azabenzanthrone and thioglycolic acid a substitution product containing sulphur is obtained. Bz.1-methoxy-8-azabenzanthrone may be prepared from Bz.1-halogen-8-azabenzanthrone by the action of sodium methylate while the action of phenol in the presence of potassium carbonate yields the corresponding phenoxy derivate.

*Example 8*

150 parts of Bz.1-brom-8-azabenzanthrone (obtainable according to Example 1 of the present application), 100 parts of potassium carbonate, 2 parts of copper carbonate and 130 parts of α-aminoanthraquinone are heated in 2000 parts of naphthalene while stirring to boiling until a sample is practically free from bromine after being worked up. Then the reaction mixture is somewhat cooled, diluted with toluene or chlorbenzene if desired, and filtered off while still hot. The inorganic substances are removed from the residue by boiling with water or dilute acid, the residue then being dried. Bz.1-α-anthraquinonyl-amino-8-azabenzanthrone obtained in the form of felt-like needles dissolves in concentrated sulphuric acid giving a yellow coloration and yielding a brown vat from which the vegetable fibres are dyed faintly violet red shades.

From one molecular proportion of Bz.1-brom-8-azabenzanthrone and ½ molecular proportion of 1.5-diaminoanthraquinone a condensation product is obtained in the form of violet brown crystals dissolving in concentrated sulphuric acid giving green coloration, while with one molecular proportion of 1.5-diaminoanthraquinone a dark violet crystalline product results.

If Bz.1-brom-8-azabenzanthrone is condensed with 1-amino-4-benzoylaminoanthraquinone a crystalline violet condensation product is obtained; if the latter component is replaced by 1-amino-5-benzoylaminoanthraquinone a crystalline brown condensation product is obtained.

Instead of α-aminoanthraquinone substitution products thereof may be used, for example 1-amino-4-methoxy or 1-amino-5-methoxyanthraquinone, 1-amino-2-methylanthraquinone, 1-amino-7-benzoylaminoanthraquinone, β-aminoanthraquinone and its derivatives, aminoanthraquinoneacridones, aminoanthraquinoneimidazoles, aminoanthraquinonethiazoles, aminoanthrapyrimidines, aminoanthrapyridones, aminoanthrapyrimidones, aminobenzanthrones etc.

By treatment with ammonia under pressure Bz.1-brom-8-azabenzanthrone yields an amino-derivative. The dibrompyrbenzanthrone obtained according to Example 6 of the said application, condensed with 2 molecular proportions of α-aminoanthraquinone yields a dark violet product.

*Example 9*

A mixture of 15 parts of Bz.1-brom-8-azabenzanthrone, 12 parts of pyrazolanthrone, 8 parts of potassium carbonate and 200 parts of nitrobenzene are heated to boiling until no unchanged initial material can no longer be detected. Then the reaction mixture is worked up in the usual manner. The condensation product obtained in the form of yellow crystals dissolves in concentrated sulphuric acid giving an orange coloration.

If di-brom-8-azabenzanthrone obtained according to Example 6 of the said application, is condensed with 1 molecular proportion of pyrazolanthrone a straw colored crystalline reaction product containing bromine is obtained.

*Example 10*

80 parts of the di-brom-azabenzanthrone obtained according to Example 6 of the said application are heated to boiling with 45 parts of pyrazolanthrone, 60 parts of potassium carbonate in 1500 parts of nitrobenzene, boiling for several hours. Then the mass is somewhat cooled, 50 parts of α-aminoanthraquinone, 50 parts of calcined sodium carbonate and 10 parts of cupric acetate are added and heated to boiling until the reaction is completed. The condensation product is isolated in the usual manner; it is a brown crystalline powder dissolving in concentrated sulphuric acid giving a green coloration.

What we claim is:—

1. An azabenzanthrone compound of the group consisting of halo-azabenzanthrone, nitro-azabenzanthrone, sulpho-azabenzanthrone, hydroxy-azabenzanthrone, alkoxy-azabenzanthrone, cyano-azabenzanthrone, and mercapto-azabenzanthrone, in which the position of the ring nitrogen of the azabenzanthrone nucleus is represented by the formula

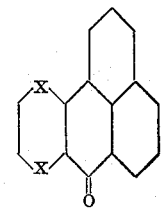

wherein one $x$ represents a nitrogen atom, the other $x$ representing —CH—.

2. An azabenzanthrone compound as defined in claim 1, in which the substituent is in the Bz-1 position.

3. An azabenzanthrone compound as defined in claim 1, in which the substituent is in the Bz-1 position and in which the azabenzanthrone is an 8-azabenzanthrone.

4. Bz.1-brom-8-azabenzanthrone corresponding to the formula:

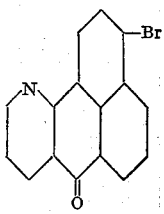

which forms yellow needles melting at between 214° to 215° C. dissolving in concentrated sulfuric acid giving a yellow coloration and a yellow-green fluorescence.

5. 6-Bz.1-dibrom - 8 - azabenzanthrone corresponding to the formula:

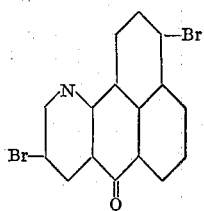

which forms yellow needles melting above 300° C. dissolving in concentrated sulfuric acid giving a yellow coloration.

6. Bz.2-nitro-8-azabenzanthrone corresponding to the formula:

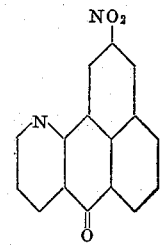

which forms orange-yellow needles melting at from 285° to 286° C.

MAX ALBERT KUNZ.
GERD KOCHENDOERFER.
KARL KOEBERLE.